Sept. 5, 1933. H. B. TARBOX Re. 18,933

LEVER MECHANISM

Original Filed Dec. 9, 1927 2 Sheets-Sheet 1

Inventor
H. B. Tarbox
by J. Edw Maybee
ATTY.

Sept. 5, 1933. H. B. TARBOX Re. 18,933

LEVER MECHANISM

Original Filed Dec. 9, 1927 2 Sheets-Sheet 2

Inventor
H. B. Tarbox
by J. Edw. Maybee
ATTY

Reissued Sept. 5, 1933

Re. 18,933

UNITED STATES PATENT OFFICE 18,933

LEVER MECHANISM

Hugh Bogart Tarbox, Toronto, Ontario, Canada

Original No. 1,810,990, dated June 23, 1931, Serial No. 238,788, December 9, 1927. Application for reissue January 21, 1933. Serial No. 652,911

7 Claims. (Cl. 74—110)

This invention relates to lever mechanism of the toggle-lever type, and my object is to devise mechanism of this type particularly adapted for use in mop wringers in which there is employed a stationary presser board and a movable presser board mounted to be moved to and from the stationary board.

In such mechanism it is desired to make the toggle mechanism as simple and compact as possible while giving a long throw, and to provide for a rapid preliminary movement of the movable part towards the stationary part and a slow powerful final movement.

I attain my object by mounting a plurality of angularly spaced lever arms on a rock shaft and by providing engaging means whereby when the shaft is rocked the lever arms successively engage at different points in its length, a link connected with the movable member.

A further object is to maintain the co-operative relationship between any one lever arm and the link until the other lever arm has been engaged, thus preventing the disengagement of the link from the arms by a rocking movement of the former.

This object is attained by forming the parts with interengaging recesses and projections which, when engaged, interlock sufficiently to resist a rocking movement of the link, other than that of normal operation, and in which the interengagement of one lever arm with the link preferably overlaps the interengagement of the other sufficiently to leave no intermediate position in which the link is entirely free.

Figure 2:
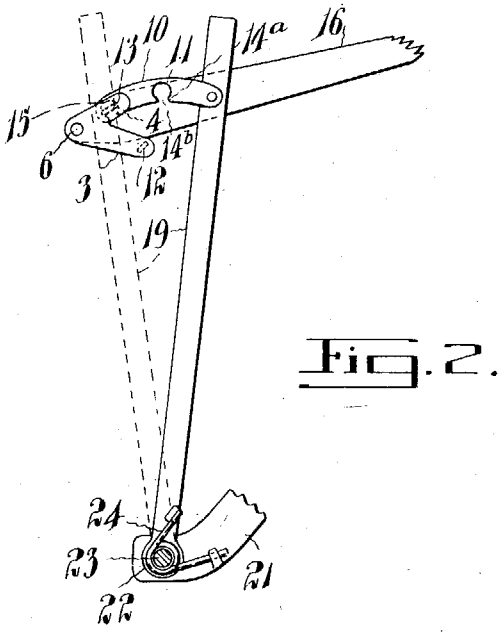
Figure 1:
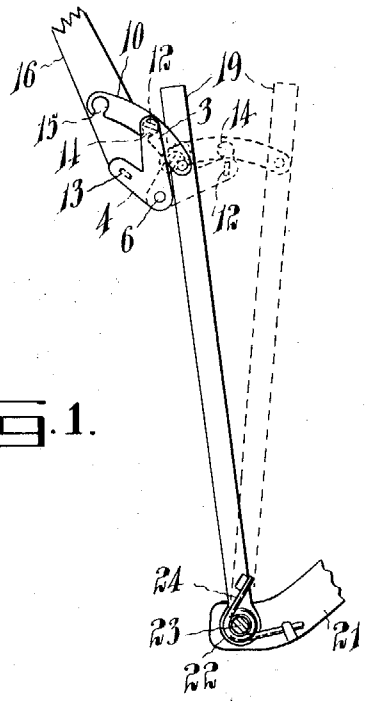
Figure 4:
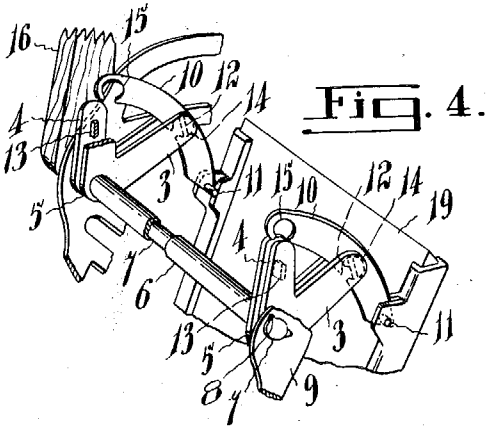
Figure 5:
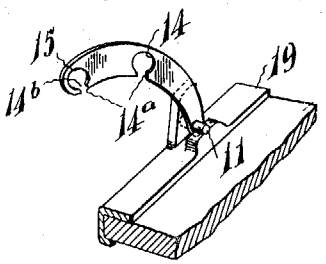
Figure 3:
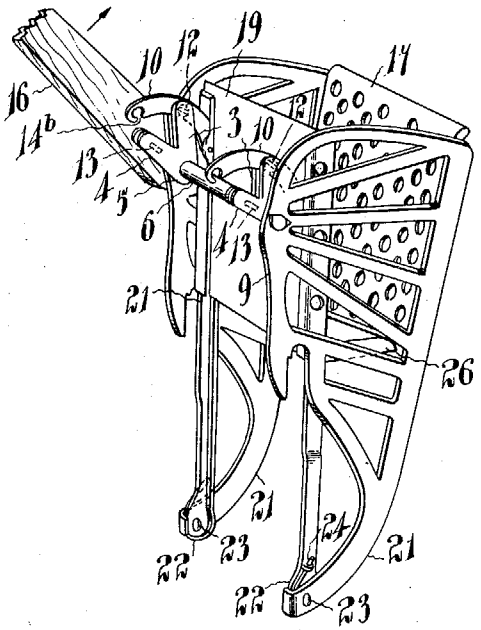

The invention is hereinafter more particularly described and is illustrated in the annexed drawings in which Fig. 1 is a diagrammatic view showing the lever mechanism in the initial position and showing in dotted lines the position of the lever arms, link and movable member at the point of engagement of the link by the following lever arm;

Fig. 2 a similar view to Fig. 1 showing the lever mechanism in its most extended position and showing in dotted lines the initial position of the movable member;

Fig. 3 a perspective view of a mop wringer showing the lever mechanism applied thereto;

Fig. 4 is a perspective view, on an enlarged scale, partly broken away of the lever mechanism shown in Fig. 3; and Fig. 5 a perspective view showing the link pivoted to the movable presser board of the mop wringer.

In the drawings like numerals of reference indicate corresponding parts in the different figures.

Referring to Figs. 3, 4 and 5, a pair of lever arms 3, 3 and 4, 4 arranged in angularly spaced relationship extend radially from each end of a shaft 6, and are connected by an elbow or boss 5 on the shaft 6. Each of the arms 3, 3 and 4, 4 extends from the shaft 6 in a direction parallel to the corresponding arm at the other end of the shaft and in the same radial direction, so that similar movements will be simultaneously effected by the arms of the two sets and similar pressure will be simultaneously exerted by them on the movable presser board 19.

The shaft 6 may be solid or hollow and rockable on an axle 7 as indicated in Fig. 4. The solid shaft 6 rocks in bearings in the side plates 9 of the stationary frame, which includes the presser board 17, and a lug 8 on the end thereof retains the shaft 6 in position. Where a hollow shaft is used the axle 7, only, extends through the side plates 9 and the lug 8 is formed on the axle 7. The shaft 6 is provided with a handle 16 for rocking said shaft and said arms.

Co-acting with each set of arms 3, 3 and 4, 4 is a link 10, one end of which is pivoted by means of a pin 11 to a lug on the movable presser board 19.

Interengaging means are provided whereby the lever arms 3 and 4 at either side engage successively the adjacent link to form a toggle to actuate the movable presser board towards the stationary board, and preferably also to effect the reverse movement though such reverse movement may be by means of a spring as hereinafter described.

The said means, in the embodiment of the invention illustrated comprise pins or projections 12 and 13 on the arms 3 and 4 respectively and shoulder forming recesses 14 and 15 in each link spaced from one another longitudinally of the link to successively receive the pins 12 and 13.

In describing the operation of the device and further details of the lever mechanism reference will be made only to one set of lever arms and its corresponding link, but it will be understood that the operation of the other set of lever arms and the other link is precisely the same.

Assuming the projection 12 to be in engagement with the recess 14 and the lever arm to be in the initial position illustrated diagrammatically in Fig. 1, when the lever arms are moved forwardly or in a clockwise direction pressure is exerted on the link 10 by the lever arm 3 causing the link to move forwardly or away from the shaft 6 and imparting a similar movement to the movable presser board 19. The movable presser board is pivotally connected at one end to the side walls 21 of the stationary frame of the mop wringer by bolts 23, 23 extending through said side walls and hubs 22, 22 formed on the ends of the side walls 21, 21 of the movable presser board 19. Therefore, the movable presser board under the pressure exerted by the lever arm on the link describes a swinging or arcuate movement.

As the lever arms are further rotated in a clockwise direction the projection 13 on the lever arm 4 enters the recess 15 at the end of the link 10 and the projection 12 recedes from the recess 14 when the projection 13 is engaged. As the lever arms are still further rotated the link 10 and presser board 19 are further advanced by the lever arm 4 until the lever mechanism reaches its most extended position as shown in Fig. 2.

Springs 24 bearing against the frame and the side walls 21, 21 of the movable presser board exert a pressure tending to cause the movable presser board 19 to return to its initial position when pressure is released on the operating handle 16, and to keep the link 10 in positive contact with the lever arms.

The recesses 14 and 15, which form shoulders against which the projections on the lever arms bear, have their forward sides 14ᵃ inclined in a direction rearwardly and towards the shaft so that when a pin or projection is engaged with a recess the two cannot be disengaged by a simple upward swing of the link until a second projection and recess have been engaged and as long as spring pressure is urging the movable presser board towards the shaft as will appear from a consideration of Figs. 1 and 2 of the drawings. The side 14ᵃ of the recess 14 extends rearwardly towards the shaft at an angle which permits disengagement of the leading lever arm 3 when the following lever arm 4 engages in the recess 15, and the side 14ᵃ of the recess 15 extends at such an angle that the following lever arm 4 may engage the recess 15 when the leadeing arm 3 disengages. While it is essential that the recess 14 and the projection 12 should be located on the link 10 and lever arm 3 respectively, it is obvious that the positions of the recess 15 and projection 13 are reversible.

As a positive return movement of the movable presser board may be desirable under some conditions, I prefer to arrange the interengaging means as follows: The projections 12 and 13 are formed as keys and the recesses are so shaped that a key can only enter and recede from a recess in one predetermined position. As shown in the drawings, the projections are rectangular in cross-section, one diameter being considerably longer than the other and the longer diameter of each projection being slightly less than the width of the corresponding recess at its widest point and the shorter diameter being slightly less than the width of the restricted neck 14ᵇ of the recess. In Figs. 3 and 4 the arms 3 and 4 are shown as being slotted to embrace the link and the projections 3 and 4 extend from one side to the other of the slotted portion.

Each projection or key is arranged so that as it arrives at the point in its swinging movement where it enters or recedes from the corresponding recess it presents its shorter diameter to the neck 14ᵇ so that it freely enters the recess. However, as it continues its movement it rotates relative to the said neck so that its longer diameter is presented to the neck and consequently it cannot be removed from the recess, thus retaining the lever arm in positive inter-engagement with the link.

The release positions are so arranged that at least one of the lever arms is interlocked with the link at any given point in the range of operation.

As shown in the drawings the arm 3 is longer than the arm 4, and during the forward movement is in advance of the arm 4 for imparting quick action to the movable presser board 19 during the initial step of the movement, as during this step the preliminary wringing action takes place and less power is required. At the completion of the initial step the shorter following arm 4 comes into action and completes the movement initiated by the arm 3. This shorter arm imparts a slower movement but exerts greater leverage for the final wringing action.

In the mop wringer shown in Fig. 3 the side walls 9 of the fixed or stationary frame are forked for straddling a pail. A stationary presser board 17 is mounted between the side walls. The mop to be wrung is placed between the two presser boards and pressure is then applied to the movable presser board in the manner above described. The fixed presser board 17 is shown as being perforate and the movable presser board imperforate and provided with a transverse base board or floor board 21 adapted to close the space between the lower ends of the presser boards.

Although the lever mechanism has been described as applied to a mop wringer, where it is particularly useful, it is illustrated, particularly in Figs. 1 and 2 in a more general way and may be applied to any similar purpose.

What I claim as my invention is:

1. In the hereinbefore described device, the combination of a rock shaft; a plurality of angularly spaced lever arms mounted thereon for simultaneous operation; a movable member; a link pivoted at one end to the movable member; and interengaging keys and recesses on the said arms and link, whereby when the arms are rocked forwardly they successively engage the link ad impart a forward movement to said link and the movable member, and when rocked in the reverse direction they impart a reverse movement to said movable member, each of said recesses having a contracted opening through which the key enters at the commencement of its engagement with the recess and recedes at the end of its engagement therewith.

2. A lever mechanism comprising two unitedly rotatable lever arms arranged one in advance of the other, the leading arm being longer than the following arm and provided with a projecting key, a pivoted link having a recess into which the key enters and from which it recedes for causing a partial forward movement of the link during the forward rotation of the lever arms, the other lever arm engaging the link and completing its forward movement when the key recedes from the recess.

3. In the hereinbefore described device the combination of two unitedly rotatable lever arms arranged one in advance of the other, the leading arm being longer than the following arm and each provided with a projecting key, in combination with a pivoted link interposed between the arms and the object to be moved, said link being provided with two recesses one for the key of the leading arm to make a releasable connection with the link for part of its travel, and the other for the key of the following arm to make a releasable connection with the link and continue its travel when the key of the leading arm is released from it.

4. In the hereinbefore described device the combination of a movable member; a fixed frame on which said member is movable; a link pivoted at one end to the movable member; a shaft journalled in the frame; two angularly spaced unitedly swingable rock arms mounted on said shaft; link engaging parts on said arms; shoulders on said link spaced longitudinally thereof and successively engageable by said parts to move the movable member in a direction away from the shaft; and a part of the leading shoulder extending rearwardly towards the shaft so as to resist disengagement of the leading arm from the said shoulder, by a simple rocking movement of the link, until the following arm is engaged with the succeeding shoulder.

5. Lever mechanism according to claim 4 in which the link and the following rock arm are provided with engaging parts which resist disengagement of the rock arm, by a simple rocking movement of the link, when the leading arm is disengaged from the link and the following arm is engaged.

6. Lever mechanism as set forth in claim 4 provided with a spring tending to move the movable member towards the shaft.

7. Lever mechanism according to claim 4 in which the link and the following rock arm are provided with engaging parts which resist disengagement of the rock arm, by a simple rocking movement of the link, when the leading arm is disengaged from the link and the following arm is engaged, and provided with a spring tending to move the movable member towards the shaft.

HUGH B. TARBOX.